Patented Nov. 1, 1949

2,486,444

UNITED STATES PATENT OFFICE 2,486,444

PROCESS OF PRODUCING ESTERS

Malcolm Kent Smith, Elizabeth, N. J., assignor to The Baker Castor Oil Company, Jersey City, N. J., a corporation of New Jersey No Drawing. Application July 8, 1947,
Serial No. 759,710

10 Claims. (Cl. 260—410.9)

This invention relates to the treatment of castor oil to form a substantially neutral and completely esterified product consisting of the methyl esters of the fatty acids contained in castor oil, said product being composed largely of methyl ricinoleate. The methyl esters made according to my invention and the acylated derivatives of methyl ricinoleate have great utility as plasticizers for natural and synthetic rubbers and resinous materials. Their advantage as plasticizers is especially notable since they are totally esterified, do not contain significant amounts of free fatty acids, and are free from other impurities such as glycerides. The methyl ricinoleate is also a useful intermediate in the preparation of other chemical products, such as fungicidal agents.

Methyl esters of the fatty acids in vegetable oils, such as castor oil, have heretofore been produced by various methods. However, the prior art methods for making these esters have been unsatisfactory because of the time consumed in effecting the reaction, the difficulty in removing the glycerine, the retention and introduction of impurities, and the complicated equipment and processing steps required; and the final products have contained fatty acids, soaps, and/or glycerides in quantities sufficient to render the products unsuitable for effective use as plasticizers or intermediates for further chemical reactions.

For example, British Patent 125,153 proposes to esterify glyceride oils and cellulose acetate in equivalent weight ratios between 3:1 and 10:1 of alcohol to glyceride, in the presence of an amount of catalyst not more than one-third of an equivalent of the combined fatty acids of the ester treated, but at least 3% catalyst based on the weight of the glyceride. The reaction product is a homogeneous mixture of ester, soap, and glycerine, attended by emulsification and saponification; subsequent dilution and acidification, including the introduction of salts, are required to separate the free fatty acids from the esterification product. Furthermore, when operating the process on a castor oil which has a low free fatty acid content, the time required for the esterification is several days.

Starrels United States Patent 1,701,703 uses as the glyceride reactant in an esterification process low-grade glycerides, dark in color, and high in free fatty acids. These glycerides are reacted with alcohol in the presence of an acid catalyst at temperatures high enough to vaporize the alcohol, i. e., about 65° C., and, after about 20 hours, 85% conversion is effected, whereupon the glycerine is separated by adding water to effect layer formation. The weight ratios of equivalents are from 10:1 to 17.5:1 of alcohol to glyceride. The esterification is by no means complete, and the time required is grossly excessive over the time required to practice the present invention.

Bradshaw, et al. United States Patent 2,271,619 illustrates esterification of glyceride oils, using cotton seed oil and coconut oils as examples to be reacted with a maximum weight equivalent of 1.75:1 alcohol:glyceride ratio. This patent states that this ratio is the upper limit for clean separation of the glycerine, and with the particular oils illustrated, states that 95–99% conversion is effected in one to two hours. The reaction temperature is about 80° C. When the suggested process is applied to castor oil, the low ratio of alcohol to glyceride in practice fails to yield a pure ester, the maximum conversion being about 80%.

Wright, et al. in "Oil & Soap" 21, 145–148 (1944), suggest that glyceride oils may be esterified with alcohols so long as the ratio of equivalent weights does not exceed a maximum of 1.6:1 of alcohol to glyceride. The publication suggests operating temperature at about 65° C. and warns that equivalent ratios in excess of 1.6:1 result in the glycerine, which is formed in the reaction, being held in the solution.

Contrary to the prior art suggestions, the actual weight ratios of alcohol to glyceride employed in carrying out the present invention are in the range from about 2:1 to about 4:1 equivalents, the time for the reaction is between 10 and 30 minutes, the temperature range is between 20° C. and 35° C.—i. e., no heating is required—and a fully esterified, substantially pure product is obtained.

One of the objects of this invention is to provide a process for the preparation of the methyl esters of the fatty acids contained in castor oil. The products of this invention are completely esterified and contain substantially no glycerides.

A further object is to provide a process for the production of mixed methyl esters from castor oil so that they have a minimal free fatty acid content.

Another object is to provide an improved process for the production of the methyl ester of ricinoleic acid from castor oil. Pure methyl ricinoleate can be readily obtained from the mixed ester product of this invention, e. g., by fractional distillation. The ease with which this separation of methyl ricinoleate from the mixed esters can be effected is related to the substantial absence of free fatty acids and glycerides from the product of this invention.

Other objects and advantages of the invention will be apparent from the following description.

*Starting materials*

In carrying out this invention, methyl esters of fatty acids contained in castor oil are prepared by causing castor oil to react with methyl alcohol in the presence of a catalyst. This catalyst is preferably an alkali metal hydroxide, although other strong bases may be used as the catalyst. The preferred alkaline materials are the alkali metal hydroxides, such as lithium hydroxide, sodium hydroxide and potassium hydroxide. The corresponding methylates may, however, be used. The amount of alkaline catalyst required to effect the desired reaction is from about 0.001 to about 0.5% by weight, based on the weight of castor oil used, the preferred amounts, particularly of sodium hydroxide, being from about 0.05 to 0.35%. It is desirable to dissolve the dry catalyst in the methyl alcohol so as to minimize the amount of moisture introduced into the reaction zone.

It is necessary that the castor oil used in the process of this invention be substantially neutral, and, in any case, that it have a free fatty acid content of less than about 0.5%. This condition, though difficult of attainment by ordinary methods, can be achieved readily, e. g., by the method disclosed in Colbeth United States Patent No. 2,249,746. When the oil used has a higher acid value, a larger than normal amount of alkaline catalyst should be used to neutralize the acid. Even when this is done, the esterification reaction is slow and a product having a high acid value results. In extreme cases, the reaction mixture tends to gel and thereby becomes difficult to process.

An exceptionally meritorious product is obtained when the free fatty acid content of the starting castor oil is less than about 0.1%. This low free fatty acid content can be attained by neutralizing castor oil in an apparatus such as that of Colbeth United States Patent No. 2,249,746. When the reaction zone is maintained substantially anhydrous during the esterification process, the methyl esters of this invention are obtained with free fatty acid contents at a level corresponding to the free fatty acid content of the starting oil, or, e. g., less than 0.1%. Such a product is especially suitable for use as a plasticizer and for the preparation of pure methyl ricinoleate, which can be used as such, or can be acylated, or cracked to yield undecylenic acid.

The molar ratio of methyl alcohol to castor oil is rather critical, and should be in the range from about 6 to 1 to about 12 to 1. It has been found that, in this range, the glycerine formed in the reaction is insoluble in the reaction mixture and may be readily separated therefrom. When the ratio is greater than about 12 to 1, the reaction mixture remains homogeneous so that glycerine removal, as described below, cannot be effected. When the ratio is lower than about 6 to 1, the esterification is incomplete, and the reaction proceeds at an uneconomically slow rate. The best results are obtained when the molar ratio is between about 7.5 to 1 and about 9 to 1. When the reactants are present in these preferred ratios, the reaction proceeds rapidly to completion.

*Reaction conditions*

It has been found in carrying out this process that the reaction proceeds most satisfactorily at temperatures in the range from about 20° to about 35° C. The preferred operating range is from about 25° to about 30° C. At temperatures lower than about 20°, the reaction proceeds so slowly as to be uneconomical. Higher temperatures than about 30° C. cause loss of catalyst due to saponification, and deleterious amounts of soap are formed. Such soap formation would defeat the purpose of this invention. When operating according to the process of this invention, no washing out of soap or splitting of the same is required. This is advantageous, because when such steps are necessary, an increase in the free fatty acid content of the product results, with corresponding detriment to the product.

The castor oil and methyl alcohol that are charged to the reactor should be substantially anhydrous, for example, the water content should be of the order of less than 0.3% by weight of the alcohol. The presence of water in the reaction zone results in higher percentages of free fatty acid in the product, and this would be undesirable for chemical uses. The presence of water also slows the reaction. When the amount of water present exceeds about 6% by weight of the alcohol, the reaction is stopped. With the present process all of these undesirable effects are obviated.

The time required for completing the reaction between the methyl alcohol and castor oil varies, as the molar ratio and other factors are altered, from about 10 to about 30 minutes. In general, the reaction rate is increased with increasing temperature and increasing proportions of alcohol to castor oil, within the ranges stated. When the conditions set forth herein are observed, the reaction proceeds quite rapidly, the primary limitation on the reaction rate being the speed at which the reactants can be effectively mixed.

A test for completeness of the reaction is as follows: when the reaction has gone to completion, the methyl esters of the fatty acids contained in castor oil after separation from the reaction mixture are characterized by the following physical properties: refractive index at 25° C.: 1.4610–1.4625; specific gravity at 15° C.: 0.929–0.931; viscosity (Gardner-Holdt): A to A–1. These physical properties were determined by testing of ester samples prepared by starting with carefully purified castor oil fatty acids, and esterifying the latter with methyl alcohol to a nil fatty acid content before separating the resulting methyl esters from the reaction mixture.

*Neutralization step*

When the control tests show that the castor oil fatty acids have been completely esterified by the methyl alcohol, the reaction mixture may be worked up in any desired manner. This may be done, for example, by adding sufficient phosphoric acid to neutralize the alkaline catalyst and provide a slight excess of acid so as to reduce the chances for emulsification when water is added at a later stage in the processing. Phosphoric acid is very suitable for effecting the neutralization. The buffer action of the salt formed in this neutralization enables the working up of the reaction mixture at a pH of less than 7.0 without any deleterious effect on the desired methyl esters. The phosphoric acid may, however, be replaced in this neutralization step by boric acid, acetic acid, or other weak acids having dissociation constants in the range from about $10^{-2}$ to about $10^{-11}$.

*Working up of product in still and countercurrent washer.*

Since a still is useful in the following method for working up the reaction mixture, it is convenient to carry out the reaction itself in the same still. Then as the next step following the neutralization of the catalyst, the temperature of the still is raised sufficiently to distill off the unreacted methyl alcohol. When the rate of recovery of alcohol has become uneconomically slow, sparging steam is introduced to remove the last of the alcohol. This leaves a mixture of crude methyl esters, glycerine, water, and the chemical products of the neutralization reaction in the still.

This mixture is then passed through a separator for removal of a large portion of the glycerine by gravity. The remaining mixture is washed countercurrently in an apparatus such as that of Colbeth United States Patent No. 2,249,746. The methyl esters thus purified, are dried, and are then suitable for use as a plasticizer or for further chemical reaction.

*Working up of product in rectifying column*

An alternative method for working up the final reaction mixture starts off, as described above, by neutralizing the reaction mixture with a slight excess of phosphoric acid. The neutralized mixture is then passed through a preheater which raises its temperature to 50 to 60° C. and, from this, it is passed into a standard alcohol rectifying column. The unreacted methyl alcohol is distilled off in this column and is at the same time rectified by its upward passage through the column. It is necessary to have sufficient reboiler capacity at the bottom of the column to enable the bottom mixture to be sufficiently heated to free it of water and alcohol.

The rectifying column may be operated by either of two procedures. According to one procedure, the alcohol is separated from the ester and rectified at the same time that it is being recovered. This requires the use of sparger steam; as a result, the glycerine recovered with the ester from the bottom of the column is rather dilute.

A preferable procedure is to use the rectifying column as a stripping column. Sparger steam is used, but the reboiler is run so hot that the methyl esters and glycerine recovered from the bottom of the column are essentially dry. This leads to the production of a concentrated glycerine of high quality which may be readily freed from the ester by gravity separation. An added step is needed in this procedure, because the alcohol off the top of the column usually contains so much water that it needs to be rectified subsequently.

The following examples are given to illustrate the invention but it is to be understood that the invention is not limited to these examples.

*Example 1.*—400 parts by weight of castor oil (free fatty acid content: 0.34%) were introduced into a reactor together with 103 parts of methyl alcohol. The catalyst, sodium hydroxide, which was 1.2 parts by weight, was introduced into the reactor in solution in the methyl alcohol. The reaction mixture was agitated for 20 minutes at a temperature between 25° and 30° C. and was then charged to a centrifuge, in which approximately 80% of the glycerine formed in the reaction was separated from the methyl ricinoleate and other components of the reaction mixture without prior neutralization thereof. The methyl esters were then freed from residual glycerine, alcohol, catalyst, and soap by washing this mixture with water in a countercurrent manner in an apparatus such as that described in Colbeth Patent No. 2,249,746. The washed methyl esters were dried, and had the following physical properties: refractive index at 25° C. was 1.4625; specific gravity at 15° C. was 0.931; viscosity (Gardner-Holdt) was A. The free fatty acid content of these esters was 0.09%.

*Example 2.*—400 parts by weight of castor oil (free fatty acid content: 0.1%) were charged to a still, together with 124 parts of methyl alcohol containing 2.0 parts of sodium hydroxide. Agitation was used to promote the reaction. The reaction was allowed to proceed for a period of 20 minutes at a temperature of 25° C.–30° C. The agitation was then stopped and the reaction mixture was neutralized with phosphoric acid, which was added in slight excess so as to eliminate the possibility of emulsion formation. Heat was then applied to the still so as to effect the distillation of the unreacted methyl alcohol. Near the end of the distillation, sparging steam was introduced into the still to aid in the removal of the last traces of alcohol. After the still contents had been cooled, they were introduced into a separator and the glycerine layer was withdrawn from the separator by gravity. The remaining mixture was washed countercurrently in the apparatus of Colbeth Patent No. 2,249,746. After drying, the methyl esters of castor oil fatty acids had the following physical constants: refractive index at 25° C. was 1.4619; specific gravity at 15° C. was 0.929; viscosity (Gardner-Holdt) was A. The free fatty acid content of these esters was 0.10%.

*Example 3.*—440 parts by weight of substantially neutral castor oil were mixed with 130 parts of methyl alcohol containing 0.02 part of sodium methylate. The mixture was agitated for 30 minutes at a temperature between 20° and 25° C. The mixture was then neutralized with phosphoric acid, which was added in slight excess so as to eliminate the possibility of emulsion formation. The neutralized mixture was then passed through a preheater which raised its temperature to about 60° C. The mixture was passed from the preheater into a standard alcohol rectifying column. Sparger steam was also introduced into the bottom of this column, the water and alcohol being withdrawn from the top of the column. The concentrated glycerine layer was separated from the bottom by gravity. The methyl esters were further purified by countercurrent washing in said Colbeth apparatus. After drying, the methyl esters were similar to those obtained in Example 2.

*Example 4.*—The reaction mixture of Example 2, unneutralized, was stripped of its excess alcohol content by distillation, using a column. The residue from this stripping operation was a soapy mixture of ester, glycerine, and water. The methyl esters of castor oil fatty acids were separated from this mixture by washing them with water acidified with sulfuric acid. The product had a good color and a free fatty acid content of 1.55%.

*Example 5.*—In a plant run, 5,520 parts by weight of castor oil were mixed with 1,675 parts by weight of methyl alcohol containing 17 parts by weight of flake sodium hydroxide. The reaction mixture was agitated at a temperature between 25° and 30° C. for 20 minutes. The reaction mixture was then worked up as described in Example 2 to give a product similar to that of Example 2.

In carrying out this invention, the actual weight ratios of alcohol to glyceride are in the range from about 2 to 1 to about 4 to 1 equivalents. The glycerine formed separates satisfactorily from the reaction mixture when the reactants are present in these ratios. When the ratio of reactants is greater than those indicated, glycerine does not separate satisfactorily from the reaction mixture. When the ratio of reactants is less than those indicated, the reaction does not go to completion, and a fully esterified product is not obtained.

As regards my reaction product, approximately 80% of the glycerine separates and can be readily removed from the reaction mixture.

What is claimed is:

1. The process of producing substantially neutral methyl esters of the fatty acids contained in castor oil, which comprises reacting methyl alcohol with castor oil containing less than about 0.5% of free fatty acids, said reactants being present in a molar ratio of from about 6 to 1 to about 12 to 1, under substantially anhydrous conditions at a temperature in the range from about 20° to about 35° C. and in the presence of about 0.001 to about 0.5% of a catalyst chosen from the group comprising alkali metal hydroxides and methylates, the amount of catalyst being based on the weight of castor oil used, and neutralizing the reaction product with an acid having a dissociation constant in the range from about $10^{-2}$ to about $10^{-11}$ while the reaction product is at a temperature below about 35° C.

2. The process of claim 1, in which the molar ratio is in the range from about 7.5 to 1 to about 9 to 1.

3. The process of claim 1, in which the reaction temperature range is from about 25° to about 30° C.

4. The process of claim 1, in which the catalyst is sodium hydroxide.

5. The process of claim 1, in which sodium hydroxide is present in an amount of about 0.05 to about 0.35%, based on the weight of castor oil used.

6. The process of claim 1, in which the reaction is continued for about 20 minutes.

7. The process of claim 1, in which the glycerine which is formed in the reaction and which is insoluble in the reaction mixture is separated from the unneutralized final reaction mixture by charging the final mixture to a centrifuge, and centrifuging it.

8. The process of claim 1, in which the glycerine which is formed in the reaction and which is insoluble in the reaction mixture is separated from the unneutralized final reaction mixture by charging the final mixture to a centrifuge, and centrifuging it, and the reaction mixture is washed with water to free it from residual glycerine, excess alcohol, catalyst, and any soap present, and the resulting purified methyl esters are dried.

9. The process of claim 1, in which the reaction product is neutralized with a slight excess of an acid having a dissociation constant in the range from about $10^{-2}$ to about $10^{-11}$, the unreacted methyl alcohol is separated by distillation with the aid of sparger steam, the glycerine layer is separated in a gravity separator, and the methyl esters are separated from the other constituents of the remaining mixture by a counter-current water washing, and are then dried.

10. The process of claim 1, in which the reaction product is neutralized with a slight excess of an acid having a dissociation constant in the range from about $10^{-2}$ to about $10^{-11}$, the neutralized mixture is heated to from about 50° to about 60° C., and is then charged to a rectifying column which is operated with sparger steam and sufficient heat to result in bottoms free from alcohol and water, the glycerine layer is separated therefrom in a gravity separator, and the methyl esters are further purified by a counter-current water washing, and are then dried.

MALCOLM KENT SMITH.

REFERENCES CITED

The following references are of record in the file of this patent:

UNITED STATES PATENTS

| Number | Name | Date |
| --- | --- | --- |
| 2,271,619 | Bradshaw | Feb. 3, 1942 |
| 2,383,602 | Keim | Aug. 28, 1945 |
| 2,383,633 | Trent | Aug. 28, 1945 |
| Re. 22,751 | Trent | Apr. 30, 1946 |